(12) United States Patent
Kim et al.

(10) Patent No.: US 10,771,195 B2
(45) Date of Patent: Sep. 8, 2020

(54) METHOD FOR CONTROLLING DOWNLINK HARQ IN WIRELESS COMMUNICATION SYSTEM AND DEVICE THEREFOR

(71) Applicant: KT CORPORATION, Gyeonggi-do (KR)

(72) Inventors: Juhee Kim, Seoul (KR); Ki-ho Lee, Seoul (KR); Ki-Tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 174 days.

(21) Appl. No.: 16/073,769

(22) PCT Filed: Jan. 16, 2017

(86) PCT No.: PCT/KR2017/000508
§ 371 (c)(1),
(2) Date: Jul. 27, 2018

(87) PCT Pub. No.: WO2017/131374
PCT Pub. Date: Aug. 3, 2017

(65) Prior Publication Data
US 2019/0036654 A1 Jan. 31, 2019

(30) Foreign Application Priority Data

Jan. 29, 2016 (KR) .................. 10-2016-0011308
Jul. 11, 2016 (KR) .................. 10-2016-0087313

(51) Int. Cl.
*H04L 1/18* (2006.01)
*H04W 76/27* (2018.01)
(Continued)

(52) U.S. Cl.
CPC .......... *H04L 1/1812* (2013.01); *H04L 1/1607* (2013.01); *H04L 1/1854* (2013.01);
(Continued)

(58) Field of Classification Search
CPC ... H04L 1/1812; H04L 1/1607; H04L 1/1896; H04L 1/1854; H04L 5/14; H04W 76/27
See application file for complete search history.

(56) References Cited

U.S. PATENT DOCUMENTS 9,924,536 B2 * 3/2018 Seo ..................... H04L 5/00
2011/0310819 A1 12/2011 Liao
(Continued)

OTHER PUBLICATIONS

R. Susitaival, H. Wiemann, J. Östergaard and A. Larmo, "Internet Access Performance in LTE TDD," 2010 IEEE 71st Vehicular Technology Conference, Taipei, 2010, pp. 1-5. (Year: 2010).*
(Continued)

*Primary Examiner* — Cynthia Britt
(74) *Attorney, Agent, or Firm* — IP Legal Services, LLC

(57) ABSTRACT

Provided are an HARQ operation procedure and control method between a terminal and a base station. In the method, the terminal receives HARQ feedback bundling control information from the base station through RRC signaling and downlink control information (DCI), bundles HARQ feedbacks in response to reception results of one or more pieces of downlink data according to the HARQ feedback bundling control information, and transmits the bundled HARQ feedbacks. The base station extracts effective information from the HARQ feedback information on the basis of transmission subframe information and checks whether the terminal receives the downlink data, thereby enabling the terminal to transmit the HARQ feedbacks while minimizing uplink resources, and the base station to perform an HARQ operation by checking whether downlink data in each subframe has been successfully transmitted.

18 Claims, 14 Drawing Sheets

(51) Int. Cl.
*H04L 5/14* (2006.01)
*H04L 1/16* (2006.01)

(52) U.S. Cl.
CPC .............. *H04L 1/1896* (2013.01); *H04L 5/14* (2013.01); *H04W 76/27* (2018.02)

(56) References Cited

U.S. PATENT DOCUMENTS

| | | |
|---|---|---|
| 2011/0310820 A1 | 12/2011 | Liao |
| 2012/0026935 A1 | 2/2012 | Park et al. |
| 2012/0099518 A1 | 4/2012 | Park et al. |
| 2012/0113884 A1 | 5/2012 | Park et al. |
| 2012/0218923 A1 | 8/2012 | Lim et al. |
| 2013/0114474 A1 | 5/2013 | Fu et al. |
| 2014/0105191 A1* | 4/2014 | Yang ................. H04L 1/1867 370/336 |
| 2015/0282146 A1 | 10/2015 | Nigam et al. |
| 2016/0164643 A1* | 6/2016 | Loehr ................. H04L 1/1854 370/336 |
| 2017/0366305 A1* | 12/2017 | Hwang ............... H04L 1/1812 |
| 2018/0198570 A1* | 7/2018 | Astely ................ H04L 1/1854 |
| 2019/0014560 A1* | 1/2019 | Takeda ............... H04L 1/1861 |
| 2019/0069164 A1* | 2/2019 | Kishiyama .......... H04W 8/20 |

OTHER PUBLICATIONS

D. Zhang and J. Zhongjun, "Research and development of designing HARQ in LTE system," 2012 2nd International Conference on Consumer Electronics, Communications and Networks (CECNet), Yichang, 2012, pp. 2773-2776. (Year: 2012).*

* cited by examiner

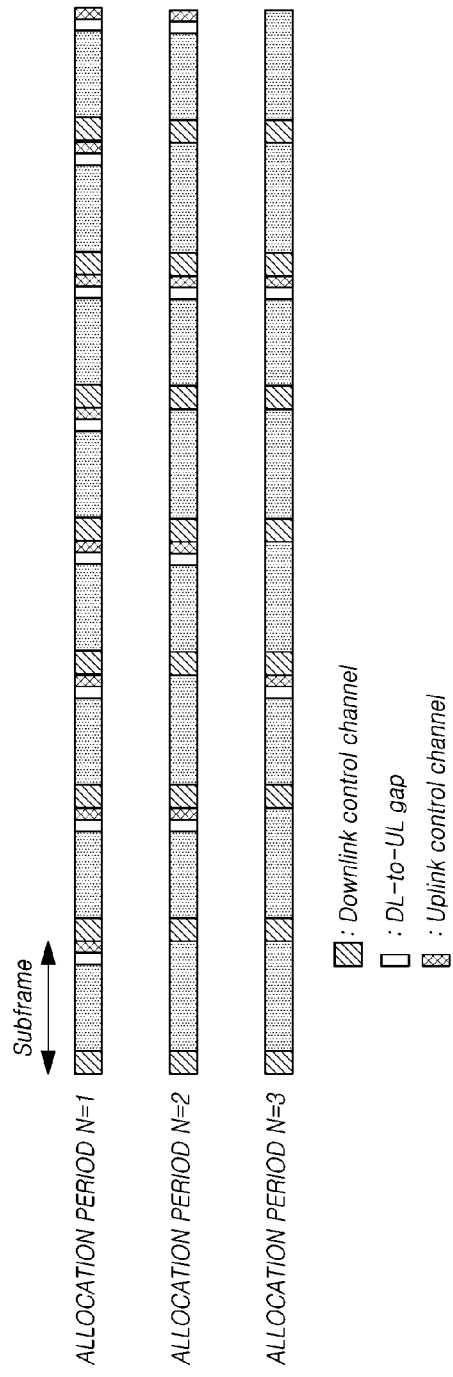

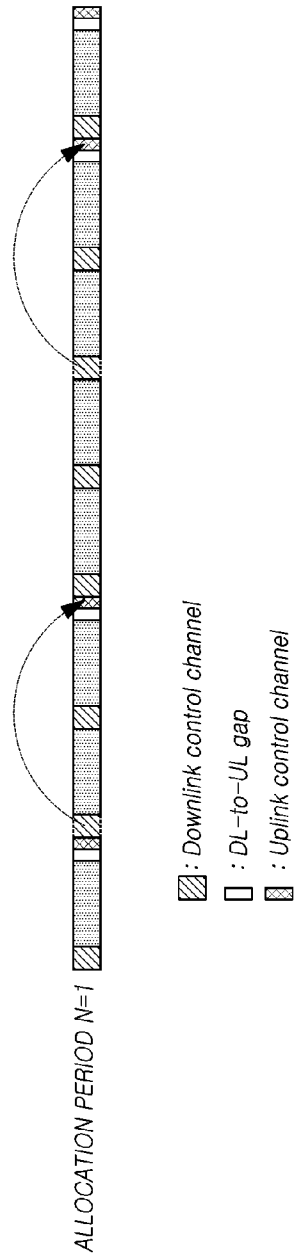

Subframe n      n+k      n+k+g

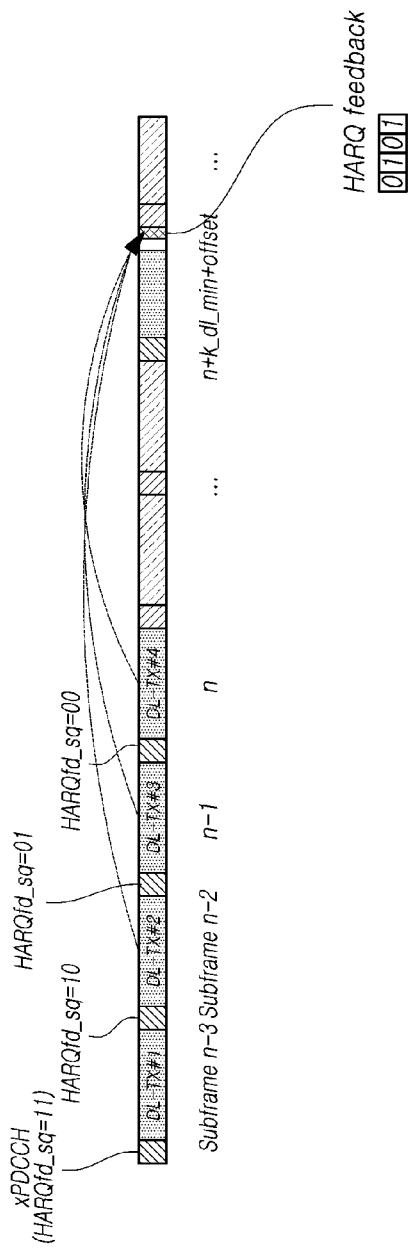

HARQ FEEDBACK BUNDLING FOR NON-SUCCESSIVE DL BURSTS

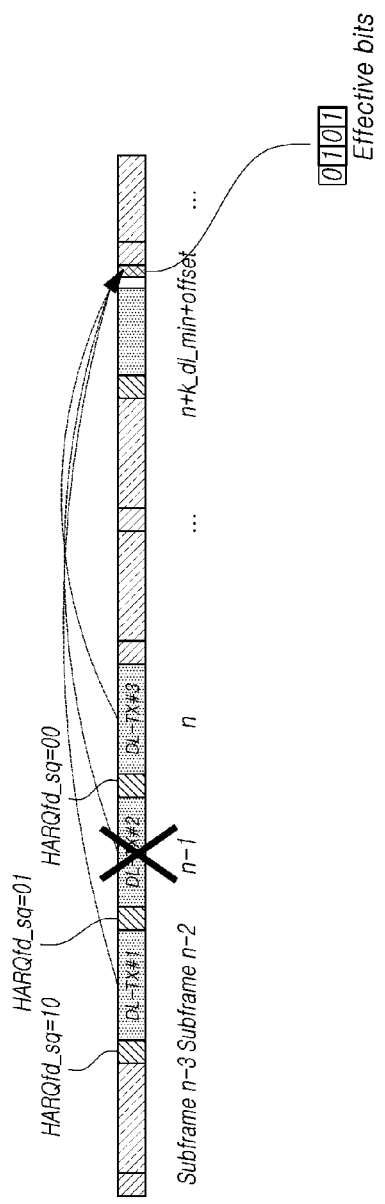

OPERATION EXAMPLE OF HARQ FEEDBACK BUNDLING DIVISION METHOD

METHOD FOR CONTROLLING DOWNLINK HARQ IN WIRELESS COMMUNICATION SYSTEM AND DEVICE THEREFOR

CROSS REFERENCE TO RELATED APPLICATIONS

This application is a National Stage Patent Application of PCT International Patent Application No. PCT/KR2017/000508 (filed on Jan. 16, 2017) under 35 U.S.C. § 371, which claims priority to Korean Patent Application Nos. 10-2016-0011308 (filed on Jan. 29, 2016), and 10-2016-0087313 (filed on Jul. 11, 2016), the teachings of which are incorporated herein in their entireties by reference.

BACKGROUND OF THE INVENTION

1. Field of the Invention

The present disclosure relates to a signal process procedure in a wireless communication system, and more specifically, to a downlink hybrid automatic repeat request (HARQ) operation procedure, a method of controlling a HARQ signal, and a device therefor.

2. Description of the Prior Art

A data traffic amount has exponentially increased, and a frequency shortage problem has been getting serious in a current cellular frequency band. For overcome such problems, it is expected to use a wide bandwidth usable millimeter wave band (e.g., an mm Wave of about 10 GHz to about 300 GHz) in a next generation cellular system.

Using the millimeter band may cause greater path loss and serious attenuation due to an atmosphere, water vapor, topography, and a planimetric feature, as compared to using the typical cellular frequency. Therefore, it is necessary to have a beamforming technology for securing coverage in order to use the millimeter band in the cellular system.

In addition, in the next generation cellular system, a time division duplex (TDD) method is firstly considered to adopt because the TDD method has high frequency efficiency and is easily applied with the beamforming technology. Especially, a dynamic TDD method dynamically configures downlink data transmission and uplink data transmission for each subframe according to a traffic condition. Such a dynamic TDD method may further increase efficiency of radio resource. Accordingly, many related studies have been conducted.

As described, the beamforming technology is essential in the next generation cellular system. However, there is limitation in the number of beams transmitted at the same time in a cellular system. Accordingly, it is necessary to develop a new scheduling method and an HARQ operation method in consideration of the limitation in the beamforming technology.

SUMMARY OF THE INVENTION

The present embodiments are directed to providing a downlink HARQ operation procedure and a control method in a cellular system using a millimeter band.

In addition, the present embodiments are directed to providing an efficient HARQ operation and a HARQ feedback control method using minimum uplink resources in consideration of a limitation of the number of beams that may be transmitted and a latency in a cellular system based on beamforming.

In an aspect, a method may be provided for of processing a HARQ, by a terminal, in a wireless communication system. The method includes receiving the number of subframes for bundling a HARQ feedback of the terminal and a HARQ feedback information size through radio resource control (RRC) signaling, receiving downlink data and downlink control information including position information of a subframe for transmitting the HARQ feedback and a HARQ feedback bundling sequence in one or more subframes, and transmitting the HARQ feedback for one or more pieces of the downlink data in one subframe determined based on a HARQ feedback delay offset included in the RRC signaling or the downlink control information.

In the bundling of the HARQ feedback information for the one or more pieces of the downlink data, a bit position in the HARQ feedback information may be determined according to an order of the HARQ feedback bundling sequence included in the downlink control information for allocating each piece of data.

In the transmitting of the HARQ feedback for the one or more pieces of the downlink data, when the HARQ feedback information size is 1 and when all pieces of the downlink data transmitted in a subframe corresponding to the number of the subframes for bundling the HARQ feedback are received, an acknowledgement (ACK) may be transmitted as the HARQ feedback. When the HARQ feedback information size is 1 and when all pieces of the downlink data transmitted in the subframe corresponding to the number of the subframes for bundling the HARQ feedback are not received, a NAK may be transmitted as the HARQ feedback.

When the HARQ feedback information size is greater than 1, the HARQ feedback may be configured according to whether to receive all of the downlink data transmitted in a subframe corresponding to the number obtained by dividing the number of the subframes for bundling the HARQ feedback by the HARQ feedback information size.

When the number of the subframes for bundling the HARQ feedback is equal to the HARQ feedback information size, the HARQ feedback may be configured and transmitted according to whether the downlink data is received in a subframe corresponding to the number of the subframes for bundling the HARQ feedback and according to the HARQ feedback bundling sequence.

When the feedback delay offsets are different from each other in successive subframes or the HARQ feedback bundling sequence is not reduced by a subframe duration, the terminal may divide and transmit the HARQ feedback for the downlink data transmitted in the successive subframes.

In another aspect, a method may be provided for receiving, by a base station, a HARQ in a wireless communication system. The method includes transmitting the number of subframes for bundling a HARQ feedback of a terminal and a HARQ feedback information size through RRC signaling, transmitting downlink data and downlink control information including position information of a subframe for transmitting the HARQ feedback and a HARQ feedback bundling sequence in one or more subframes, and receiving the HARQ feedback for one or more pieces of the downlink data in one subframe determined on the basis of a HARQ feedback delay offset included in the RRC signaling or the downlink control information.

In configuring the downlink control information related to HARQ feedback bundling for one or more pieces of the downlink data, a bit position in the HARQ feedback information may be determined by giving the HARQ feedback bundling sequence according to an order of a transmission subframe.

When the number of the subframes for bundling the HARQ feedback is equal to the HARQ feedback information size, the base station may a) receive the configured HARQ feedback according to whether the terminal receives the downlink data transmitted in a subframe corresponding to the number of the subframes for bundling the HARQ feedback and according to the HARQ feedback bundling sequence, b) may bit-mask the HARQ feedback received on the on the basis of whether the downlink data for each subframe is transmitted, and c) extract a valid HARQ feedback.

In another aspect, a terminal may be provided for processing a HARQ in a wireless communication system. The terminal includes a communication unit configured to receive the number of subframes for bundling a HARQ feedback and a HARQ feedback information size through RRC signaling, receive downlink data and downlink control information including position information of a subframe for transmitting the HARQ feedback and a HARQ feedback bundling sequence in one or more subframes, and receive a HARQ feedback delay offset through the RRC signaling or the downlink control information, and a control unit configured to form the HARQ feedback for one or more pieces of the downlink data in one subframe determined on the basis of the HARQ feedback delay offset and transmit the HARQ feedback through the communication unit.

In another aspect, a base station may be provided for receiving a HARQ in a wireless communication system. The base station includes a control unit configured to generate the number of subframes for bundling a HARQ feedback of a terminal and a HARQ feedback information size to be transmitted through RRC signaling, generate downlink control information including position information of a subframe for transmitting the HARQ feedback and a HARQ feedback bundling sequence, and generate a HARQ feedback delay offset to be transmitted through the RRC signaling or the downlink control information, and a communication unit configured to transmit the downlink data in one or more subframes, transmit the RRC signaling and the control information, and receive the HARQ feedback for one or more pieces of the downlink data in one subframe determined on the basis of the HARQ feedback delay offset.

Advantageous Effects

According to the present embodiments, an HARQ operation can be efficiently supported while minimizing uplink resource overhead in a dynamic time division duplex (TDD) system, by bundling a reception result of a terminal for downlink data transmitted in one or more subframes to transmit the bundled result as one HARQ feedback.

According to the present embodiments, a method and a related message structure may be provided for configuring a downlink control message of a base station for HARQ feedback bundling of a terminal. Through the method and related message structure, the terminal can effectively recognize the HARQ feedback bundling, and the base station can easily extract valid HARQ feedback information.

BRIEF DESCRIPTION OF THE DRAWINGS

FIGS. 2A and 2B are diagrams for describing an uplink resource allocation method for a HARQ feedback in a system based on dynamic TDD.

FIGS. 6A to 6D are diagrams for describing an example of a HARQ operation in a dynamic HARQ feedback delay method according to embodiments.

DETAILED DESCRIPTION OF THE EXEMPLARY EMBODIMENTS

Figure 1:
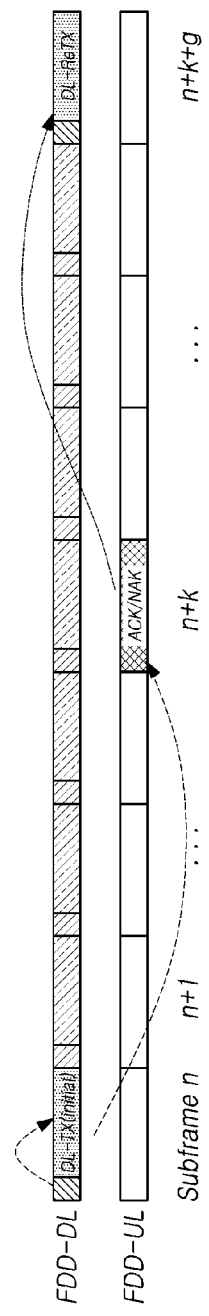
FIG. 1 is a diagram for describing a downlink HARQ operation in a cellular system.

Hereinafter, some embodiments of the present disclosure will be described in detail with reference to the accompanying drawings. In adding reference numerals to elements in each drawing, the same elements may have the same reference numerals, if possible, even though the elements are shown in different drawings. Further, in the following description of the present disclosure, a detailed description of known configurations or functions incorporated herein will be omitted when it is determined that the description may make the subject matter of the present disclosure rather unclear.

In addition, in describing elements of the present disclosure, terms such as "first," "second," "A," "B," "(a)," and "(b)" may be used. Such terms are intended to distinguish an element from another element, and the nature, order, sequence, number, or the like is not limited by the terms. In a case where it is described that an element is "connected" to, "combined" with, or "accesses" another element, the element may be directly connected to or access another element, however, it should be understood that another element may be interposed between each element, or each element may be "connected" to, "combined" with, or "access" the other element through another element.

In the present specification, a machine type communication (MTC) terminal may refer to a terminal that supports low cost (or low complexity), a terminal that supports coverage enhancement, or the like. Alternatively, in the present specification, the MTC terminal may refer to a terminal that is defined as a specific category for supporting low cost (or low complexity) and/or coverage enhancement.

In other words, in the present specification, the MTC terminal may refer to a newly defined $3^{rd}$ generation partnership project (3GPP) Release-13 low cost (or low complexity) user equipment (UE) category/type that executes an LTE-based MTC related operation. Alternatively, in the present specification, the MTC terminal may refer to a UE category/type that is defined in or before 3GPP Release-12 that supports the enhanced coverage or supports low power consumption in comparison with the existing LTE coverage, or may refer to a newly defined Release-13 low cost (or low complexity) UE category/type.

A wireless communication system in the present disclosure is placed for providing various types of communication services such as a voice service and a packet data service. The wireless communication system includes a UE and a base station (BS) (e.g., an evolved node-B (eNB)). The UE in the present specification is a comprehensive concept that means a terminal in wireless communication, and should be construed as a concept including UE in wideband code division multiple access (WCDMA), long term evolution (LTE), high speed packet access (HSPA), or the like, and a mobile station (MS), a user terminal (UT), an subscriber station (SS), a wireless device, and the like in global systems for mobile communication (GSM).

A BS or a cell may generally refer to a station where performs communication with a UE. The BS or the cell may be referred to as another term such as a node-B, an eNB, a sector, a site, a base transceiver system (BTS), an access point, a relay node, a remote radio head (RRH), a radio unit (RU), and a small cell.

That is, the BS or the cell in the present specification should be construed as a comprehensive meaning indicating some area or function covered by a BS controller (BSC) in CDMA, a node-B in WCDMA, an eNB in LTE, a sector (site), or the like. The BS or the cell means inclusively all of various coverage areas such as a megacell, a macrocell, a microcell, a picocell, a femtocell, a relay node, an RRH, an RU, and a small cell communication range.

Each of the above-described various cells has a BS that controls a corresponding cell. Thus, the BS may be construed in two ways: i) the BS may be a device that provides a megacell, a macrocell, a microcell, a picocell, a femtocell, and a small cell in association with a wireless area, or ii) the BS may indicate a wireless area itself. In item i), a BS may be a) devices interacting with one another and controlled by an identical entity to provide a predetermined wireless area or b) devices that cooperatively configure the wireless area. According to a configuration type of the wireless area, an eNB, an RRH, an antenna, an RU, a low power node (LPN), a point, a transmission/reception point, a transmission point, a reception point, or the like may be an embodiment of the BS. In item ii), the BS may be a wireless area itself that receives or transmits a signal from a perspective of a terminal or a neighboring BS.

Thus, the BS may include the megacell, the macrocell, microcell, the picocell, the femtocell, the small cell, the RRH, the antenna, the RU, the LPN, the point, the eNB, the transmission/reception point, the transmission point, and the reception point.

In the present specification, the UE and the BS are used as two inclusive transmitting and receiving subjects to implement the technology and technical spirit described in the present specification, but limited to a predetermined term or word. The UE and the BS are used as two (uplink (UL) or downlink (DL)) inclusive transmitting and receiving subjects to implement the technology and technical spirit described in the present specification, but not limited to a predetermined term or word. Here, the UL refers to a data path or a communication link from the UE to the BS for the UE to transmit and receive data to and from the BS, and the DL refers to a data path or a communication link from the BS to the UE for the BS to transmit and receive data to and from the UE.

A multiple access scheme may be unrestrictedly applied to a wireless communication system. Various multiple access schemes such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. Embodiments of the present disclosure may be applied to resource allocation in asynchronous wireless communication that evolves into LTE/LTE-Advanced through GSM, WCDMA, and HSPA. Furthermore, embodiments of the present disclosure may be applied to resource allocation in a synchronous wireless communication field or the like that evolves into CDMA, CDMA-2000, and UMB. The present disclosure should not be construed to be restricted to or limited to a specific wireless communication field and should be construed as including all technical fields to which the spirit of the present invention may be applied.

UL transmission and DL transmission may be performed using one of i) a time division duplex (TDD) scheme that performs transmission using different times and ii) a frequency division duplex (FDD) scheme that performs transmission using different frequencies.

In addition, in a system such as LTE and LTE-Advanced, the UL and the DL are configured based on one carrier or a pair of carriers according to a related standard. The UL and the DL transmit control information through a control channel such as a physical DL control channel (PDCCH), a physical control format indicator channel (PCFICH), a physical hybrid ARQ indicator channel (PHICH), a physical UL control channel (PUCCH), and an enhanced physical DL control channel (EPDCCH). The UL and the DL are configured with a data channel such as a physical DL shared channel (PDSCH) and a physical UL shared channel (PUSCH) to transmit data.

Meanwhile, the control information may be transmitted using an enhanced PDCCH or an extended PDCCH (EPDCCH).

In the present specification, a cell may refer to a coverage of a signal transmitted from a transmission/reception point, a component carrier having the coverage of the signal transmitted from the transmission/reception point (transmission point or transmission/reception point), or the transmission/reception point itself.

A wireless communication system to which embodiments are applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and terminals.

The multiple transmission/reception points may be a BS, a macrocell (hereinafter, 'eNB'), and at least one RRH that is connected to an eNB through an optical cable or an optical fiber, controlled in a wired manner, and has high transmission power or low transmission power in a macrocell area.

Hereinafter, the DL refers to communication or a communication path from multiple transmission/reception points to a terminal, and the UL refers to communication or a communication path from the terminal to the multiple transmission/reception points. In the DL, a transmitter may be a part of the multiple transmission/reception points, and a receiver may be a part of the terminal. In the UL, the transmitter may be a part of the terminal, and the receiver may be a part of the multiple transmission/reception points.

Hereinafter, transmission and reception of a signal through a channel such as a PUCCH, a PUSCH, a PDCCH, an EPDCCH, or a PDSCH will also be expressed as 'transmission and reception of the PUCCH, the PUSCH, the PDCCH, the EPDCCH, or the PDSCH'.

In the specification, a description of a) PDCCH transmission and reception and b) signal transmission and reception through PDCCH may include a meaning of c) EPDCCH transmission and reception and d) signal transmission and reception through EPDCCH.

That is, a physical DL control channel described below may be at least one of the PDCCH and the EPDCCH.

In some paragraphs of the specification, embodiments of the present disclosure are described using the PDCCH for convenience of description and ease of understanding. However, the EPDCCH according to an embodiment of the present disclosure may also be applied to those paragraphs that describes the same embodiments with the PDCCH. In addition, the PDCCH may also be applied to paragraphs that describe the embodiments with the EPDCCH.

Meanwhile, high layer signaling described below includes radio resource control (RRC) signaling which transmits RRC information including an RRC parameter.

The eNB performs DL transmission to terminals. The eNB may transmit a PDSCH which is a main physical channel for unicast transmission, DL control information such as scheduling required to receive the PDSCH, and a PDCCH for transmitting scheduling approval information for transmission through an UL data channel (for example, a PUSCH). Hereinafter, transmission and reception of a signal through each channel will be described as transmission and reception of a corresponding channel.

As described, a data traffic amount has been increasing exponentially and a frequency shortage problem has been getting serious in a current cellular frequency band. To overcome such problems, it is expected to use a wide bandwidth usable millimeter wave (an mmWave of 10 GHz to 300 GHz) band in a next generation cellular system.

The millimeter band may cause greater path loss and serious attenuation due to an atmosphere, water vapor, topography, and a planimetric feature, as compared to the typical cellular frequency band. Therefore, in order to use the millimeter band in the cellular system, beamforming technology is necessary for securing coverage.

In addition, a TDD method has comparatively high frequency efficiency and can be sassily applied with the beamforming technology. Accordingly, the TDD method is firstly considered in the next generation cellular system. Especially, a dynamic TDD method may dynamically configure DL data transmission and UL data transmission for each subframe according to a traffic condition. The dynamic TDD method may improve the efficiency of radio resources. Accordingly, many related studies have been conducted.

Meanwhile, a cellular system has a limitation in the number of beams that may be transmitted at the same time based on a beamforming. Accordingly, it is necessary to develop a scheduling method and a HARQ operation method in consideration of the number of beams.

Hereinafter, an effective DL HARQ operation procedure and an effective control method in a next generation cellular system according to embodiments of the present disclosure will be described with reference to the accompanying drawings.

FIG. 1 is a diagram for describing a DL HARQ operation in a cellular system.

Referring to FIG. 1, in a HARQ (an example of an FDD) in the cellular system, after a terminal receives a data burst, the terminal transmits a HARQ feedback after a fixed subframe ((n+k)$^{th}$ subframe in FIG. 1 and k=4 in the case of LTE FDD) without additional control information.

The BS determines re-transmission according to the received HARQ feedback information. In a case where the re-transmission is necessary, the BS transmits a re-transmission data burst after a predetermined time ((n+k+g)$^{th}$ subframe in FIG. 1 and g is set by a BS scheduler in the case of LTE FDD).

FIGS. 2A and 2B are diagrams for describing an UL resource allocation method of the HARQ feedback in a system based on dynamic TDD.

Unlike the above-described FDD cellular system, in the dynamic TDD system, an allocation of the UL resources (xPUCCH) for the HARQ feedback may be periodically performed without an additional indication (see FIG. 2A), or an on-demand allocation of the UL resources may be performed through a control message (see FIG. 2B).

FIG. 2A illustrates a method of performing the allocation of the UL resources for the HARQ feedback. As shown in FIG. 2A, the UL resources for the HARQ feedback is allocated according to an allocation period N without the additional indication.

For example, in a case where N=1, the allocation of the UL resources for the HARQ feedback is performed in each subframe. In a case where N=2 or N=3, the allocation of the UL resources for the HARQ feedback is performed in each second or third subframe.

As shown in FIG. 2A, the periodic HARQ feedback resource allocation method does not require an additional DL control message. However, since fixed wireless resources are always reserved, the periodic HARQ feedback resource allocation method is inefficient in terms of resource overhead.

The resource overhead may be reduced by increasing the allocation period (N in FIG. 2). However, in this case, a wireless section transmission latency is also increased (in the case of a next generation 5G system having requirements of a ultra-low latency of 1 msec, a small value less than 3 is appropriate as the allocation period).

On the other hand, as shown in FIG. 2B, a dynamic HARQ feedback resource allocation method may reduce the resource overhead by dynamically allocating UL resources as the occasion demands.

However, for the UL resource allocation for the HARQ feedback, the BS should transmit DL control information (DCI) through a DL control channel (xPDCCH) or transmit user-specific allocation information through RRC signaling.

Therefore, an efficient HARQ operation and a HARQ feedback control method using minimum UL resources in consideration of a limitation of the number of beams that may be transmitted, latency, and the like.

An object of the present embodiments is to provide a HARQ method and an efficient control message configuration method using minimum HARQ feedback resources in a mobile communication system based on dynamic TDD, in consideration of a characteristic of a HARQ operation procedure in the above-described cellular system.

Specifically, the present embodiments include a DL HARQ process of transmitting a reception result of the terminal for the DL data transmitted in one or more subframes in a mobile communication system to one HARQ feedback transmission channel, and a HARQ feedback bundling method of the terminal (see FIG. 3), a method of extracting valid HARQ feedback information in a HARQ feedback channel received by the BS, and a DL control message configuration method and a related message structure for enabling the terminal to effectively recognize the HARQ feedback bundling.

Figure 3:
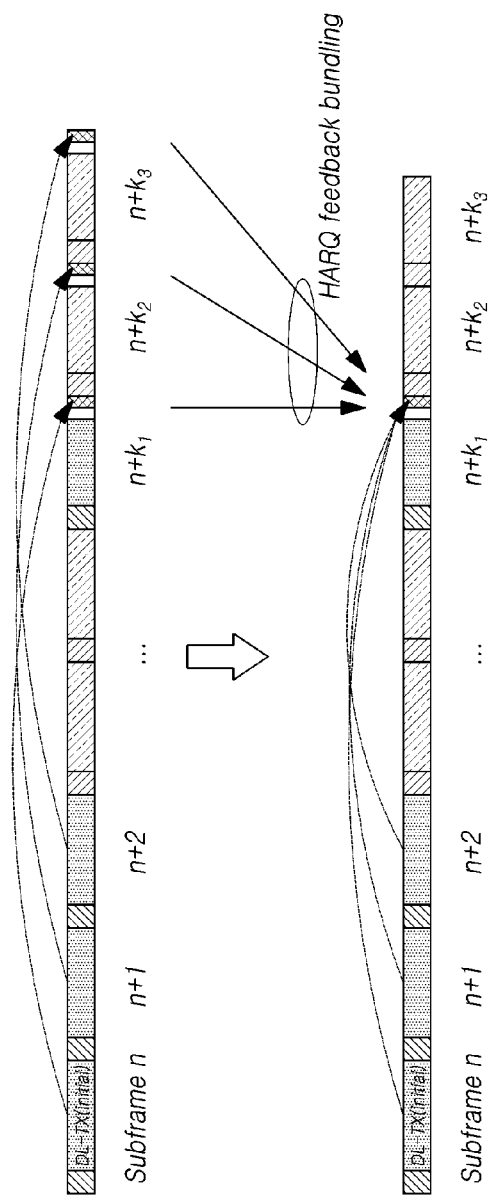
FIG. 3 is a diagram for describing a downlink HARQ operation and an overview of an HARQ feedback bundling according to embodiments.
Figure 4:
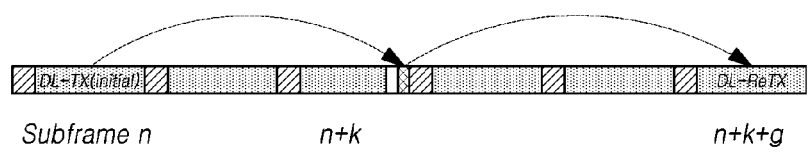
FIG. 4 is a diagram for describing definitions of main parameters for a downlink HARQ operation according to embodiments.

FIG. 3 is a diagram for describing the DL HARQ operation and an overview of the HARQ feedback bundling according to embodiments. FIG. 4 is a diagram for describing definitions of main parameters for the DL HARQ operation according to embodiments.

First, the main parameters for the DL HARQ operation according to embodiments in the dynamic TDD structure are as follows.

k: a delay time in units of subframes between data and a HARQ feedback for transmitting success or failure of a reception of the data g: a delay time in units of subframes between the HARQ feedback and corresponding re-transmission (in a case where a NAK is received)

The HARQ feedback delay k may be: 1) determined by the BS scheduler for each data transmission, and the value thereof may be transmitted to the terminal through the DCI including the DL scheduling information (dynamic HARQ feedback delay method); or 2) implicitly determined according to HARQ feedback bundling information included in each piece of DCI because a fixed reference value is determined through RRC signaling (semi-static HARQ feedback delay method).

The BS informs the terminal of a HARQ feedback delay indication method selected through RRC signaling and the maximum subframe number (M_1).

That is, an RRC message includes the following information for the HARQ operation.

HARQ feedback indication type (1 bit)

HARQ feedback delay offset (HARQfd_delay_offset): in the case of 'HARQ feedback indication type'=1, validness The maximum subframe number (M_1) for bundling the HARQ feedback: the maximum subframe number may be configured as one value among {1, 2, 4, 8, and 16}

HARQ feedback information size (M)

The HARQ feedback information size (M) transmitted to the HARQ feedback channel (xPUCCH) by the terminal according to embodiments may be configured as one value among {1, 2, 4, and 8} bits less than the M_1 bits through RRC signaling.

The BS determines the M according to resource and channel situations in a semi-static method and transfers the M to the terminal through RRC signaling.

Figure 5:
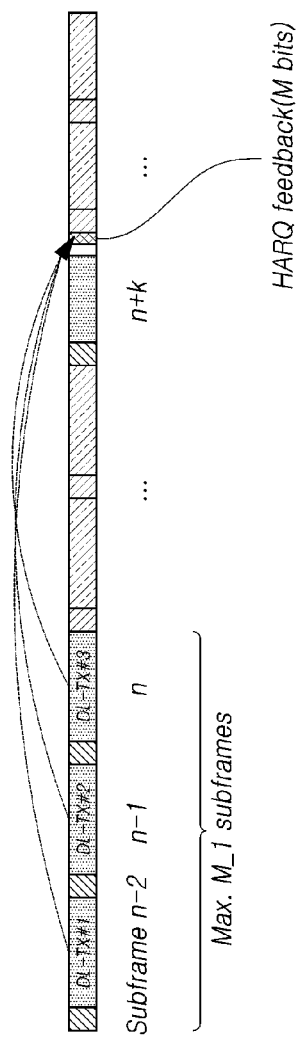
FIG. 5 is a diagram for describing a HARQ feedback operation.

FIG. 5 is a diagram for describing a HARQ feedback operation and illustrates transmitting a HARQ feedback for data transmitted in an M_1 subframe in M bit(s) using an UL resource of one subframe.

In the case of M=1 bit, the terminal transmits an acknowledgement (ACK) only when all data bursts transmitted in the M_1 subframe are successfully received, and the terminal transmits a NAK even when only one piece of the M_1 subframe data is not successfully received.

For example, in a case where all the data bursts transmitted in subframes n−2, n−1, and n are received, the terminal transmits the ACK In a case where any of the data bursts transmitted in the three subframes is not received, the terminal transmits the NAK.

In the case of M>1, the terminal transmits a HARQ ACK/NAK in a method similar to that of the case of M=1 bit with respect to an M_1/M transmission data burst.

For example, in the case of M=2, M_1=4, and the data burst is transmitted in subframes n−3, n−2, n−1, and n, a) when all the data bursts transmitted in the subframes n−3 and n−2 are successfully received, 1 is set, b) when any of all the data bursts transmitted in the subframes n−3 and n−2 is not successfully received, 0 is set, c) when all the data bursts transmitted in the subframes n−1 and n are successfully received, 1 is set, and d) when any of all the data bursts transmitted in the subframes n−1 and n is not successfully received, 0 is set. Therefore, 2 bits of HARQ feedback may be transmitted.

Hereinafter, a specific method of configuring HARQ feedback bundling control information through RRC signaling and the downlink control information (DCI) will be described.

First Embodiment: Dynamic HARQ Feedback Delay Method

The k is a value determined by the BS scheduler for each data transmission and may be identified through the DCI. Each terminal transmits 1) the minimum k value (k_dl_min) and 2) the maximum number of HARQ processes (Max_No_HARQ_processes) that may be supported during a procedure (higher layer signaling, RRC message)) of transmitting its own capability to the BS. The BS determines the k whenever the data is transmitted in consideration of the minimum k value (k_dl_min) and a scheduling situation.

The DCI according to embodiments includes the following pieces of information.

DL scheduling information

Current subframe information (IND_Sftype, 1 bit): information indicating a symbol duration for data in the current subframe if IND_Sftype=0, ▆▆▆ (a duration from the symbol duration for the xPDCCH to an end of the subframe)

if IND_Sftype=1, ▆▆▆ (an duration from the symbol duration for the xPDCCH to a front of a last xPUCCH section+TDD gap section)

HARQ feedback delay offset (HARQfd_delay_offset)

HARQ feedback bundling sequence (HARQfd_sq)

If M_1=1, 0 bit

If M_1=2, 1 bit sequence (toggle is performed as 1/0, and the HARQ feedback is transmitted from a subframe of 0 after a $k^{th}$ subframe)

If M_1=4, 2 bit sequence (a value is set in an order of 11, 10, 01, and 00, and the HARQ feedback is transmitted from a subframe of 00 after the $k^{th}$ subframe)

If M_1=8, 3 bit sequence (a value is set in an order of 111, 110, 101, . . . , and 000, and the HARQ feedback is transmitted from a subframe of 000 after the $k^{th}$ subframe)

The terminal calculates the k using the above-described information received through the DCI and the following Equation 1.

$$\text{HARQ feedback delay } (k) = k\_dl\_min + HARQfd\_delay\_offset + HARQfd\_sq \qquad \text{[Equation 1]}$$

FIGS. 6A to 6D are diagrams for describing examples of a HARQ operation in a dynamic HARQ feedback delay method that is a first embodiment among HARQ feedback operations according to embodiments, and is an example of a detailed HARQ operation for a case of M_1=M=4.

The terminal transmits the HARQ feedback from a subframe ($n^{th}$ subframe in FIG. 6) that is HARQfd_sq=00 after k_dl_min+HARQfd_delay_offset with respect to reception results of M DL data bursts of which 'HARQfd_sq' values are from 11 to 00.

In the example of FIGS. 6A to 6D, since HARQ feedback information is M=4 bits, 1 bit from the least significant bit (LSB) indicates a decoding result for the DL data burst of the (current subframe number−k_dl_min−HARQfd_delay_offset−1) subframe.

Figure 6B:
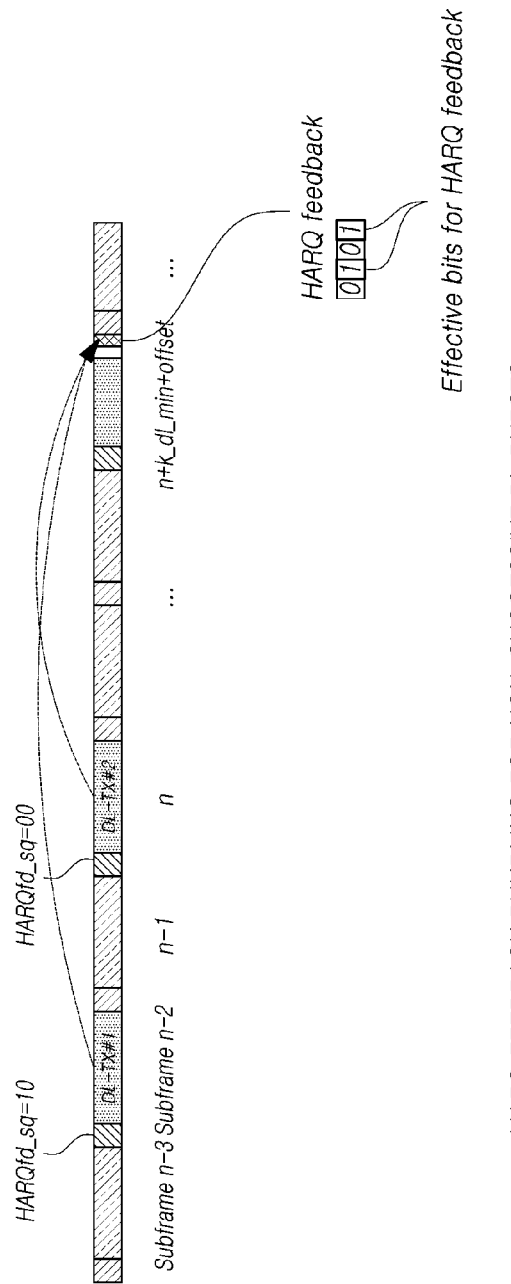

In a case where the data burst to be HARQ bundled is not successively allocated, the BS scheduler configures HARQfd_sq by reducing HARQfd_sq by a transmission subframe duration as in the example of FIG. 6B. In a case where there is no DL transmission in a corresponding subframe, the terminal performs a feedback as the NAK.

The BS bit-masks M bits with actual transmission subframe information and performs a HARQ feedback process only on a valid bit.

In a case where the BS transmits data in an (n−1)$^{th}$ subframe and the terminal does not successively receives the xPDCCH as in the example of FIG. 6C, similarly to the above-described example of FIG. 6B, the terminal feeds the NAK back to a corresponding bit. As a result of the bit-masking with the DL transmission subframe information at the BS, the corresponding bit is a valid bit, the NAK (data decoding fail) is recognized and thus HARQ data re-transmission is determined.

Figure 6D:
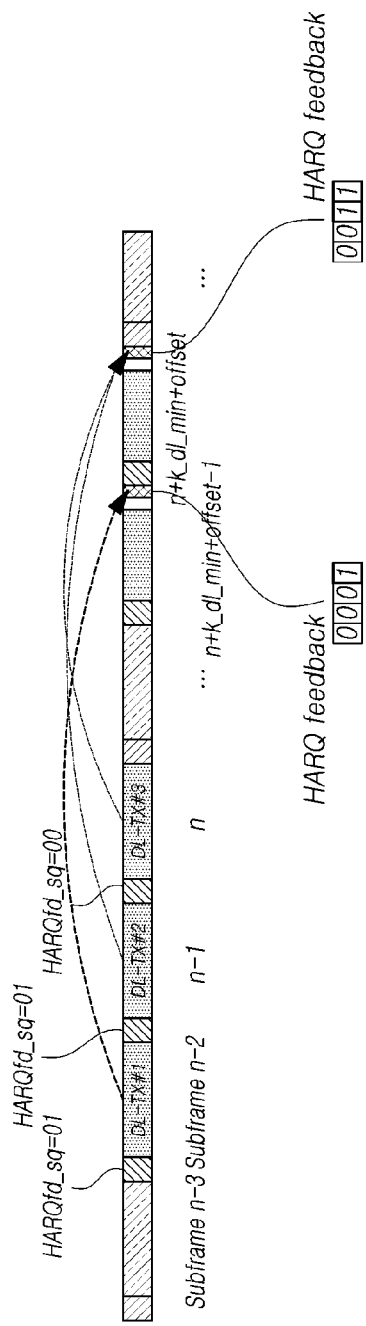

Meanwhile, in an example of FIG. 6D and successive subframes, in a case where the 'HARQfd_sq' value is not reduced by the subframe duration or HARQfd_delay_offset values are different, the terminal transmits the HARQ feedback by bundling only up to data of a previous subframe.

Second Embodiment: Semi-Static HARQ Feedback Delay Method

The BS determines the HARQfd_delay_offset value in consideration of the k_dl_min and the scheduling situation, and the BS transmits the determined HARQfd_delay_offset value to the terminal through the RRC signaling message. The terminal calculates the k according to Equation 1 using the HARQfd_delay_offset included in the RRC message and the HARQfd_sq received through the DCI.

The DCI includes information equal to information elements described in the dynamic HARQ feedback delay method, and the DCI does not include the HARQfd_delay_offset.

A detailed HARQ operation procedure is the same as the HARQ operation in the dynamic HARQ feedback delay method.

According to the embodiments described above, it is possible to effectively support the HARQ operation while minimizing the UL resource overhead in the dynamic TDD system.

Figure 7:
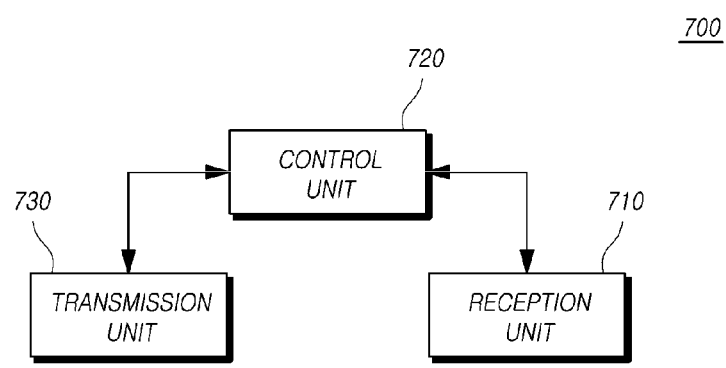
FIG. 7 is a diagram illustrating a configuration of a terminal according to embodiments.

FIG. 7 illustrates a configuration of a terminal according to embodiments. The terminal 700 according to embodiments may include a reception unit 710, a control unit 720, and a transmission unit 730.

The reception unit 710 receives the number of subframes for bundling a HARQ feedback and a HARQ feedback information size through RRC signaling. In addition, the reception unit 710 receives DL data in at least one subframe and receives DCI including position information of a subframe for transmitting the HARQ feedback and a HARQ feedback bundling sequence.

In addition, the reception unit 710 receives a HARQ feedback delay offset included in the RRC signaling or the DCI and transmits the received information to the control unit 720.

The control unit 720 generates HARQ feedback information for a reception result of one or more pieces of the DL data according to the HARQ feedback bundling information received through the RRC signaling or the DCI.

In this case, in the bundling of the HARQ feedback information for the one or more pieces of the DL data, a bit position in the HARQ feedback information is determined according to an order of the HARQ feedback bundling sequence included in the DCI for allocating each piece of data.

The transmission unit 730 transmits the HARQ feedback information generated by the control unit 720 from a subframe associated the smallest HARQ feedback bundling sequence to a subframe after the HARQ feedback delay offset.

Figure 8:
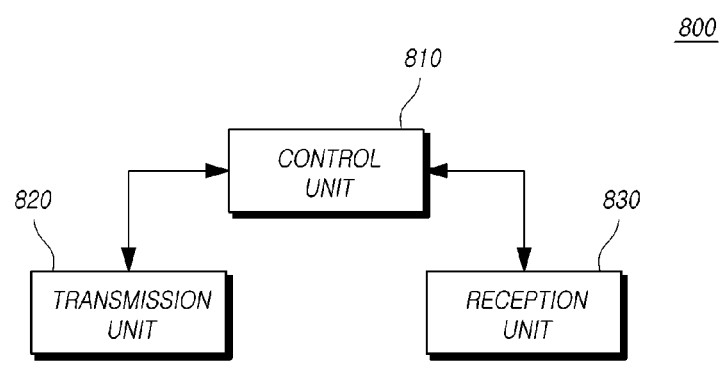
FIG. 8 is a diagram illustrating a configuration of a base station according to embodiments.

FIG. 8 illustrates a configuration of a BS according to embodiments. The BS 800 according to embodiments may include a control unit 810, a transmission unit 820, and a reception unit 830.

The control unit 810 configures the RRC signaling including the maximum subframe number for bundling a HARQ feedback indication type, a HARQ feedback delay offset, and the HARQ feedback, and the HARQ feedback information size.

In addition, the control unit 810 configures the downlink control information (DCI) including the position information of the subframe for transmitting the HARQ feedback and the HARQ feedback bundling sequence.

In this case, the HARQ feedback delay offset may be included in the DCI. In this case, the HARQ feedback indication type may be set to 0 in the RRC signaling so that the HARQ feedback delay offset of the RRC signaling is not valid.

The transmission unit 820 transmits the DL data to the terminal in one or more subframes. The transmission unit 820 transmits the RRC signaling and the DCI configured by the control unit 810 to the terminal to provide the HARQ feedback bundling control information to the terminal.

The reception unit 830 receives the HARQ feedback information obtained by bundling the reception result for the one or more pieces of the DL data.

The control unit 810 bit-masks the received HARQ feedback information on the basis of information of a transmission subframe of the DL data and extracts valid HARQ feedback information. In addition, according to the HARQ feedback information, the control unit 810 re-transmits the DL data of a subframe during which the terminal fails to receive the DL data, in a subframe after a designated duration.

Figure 9:
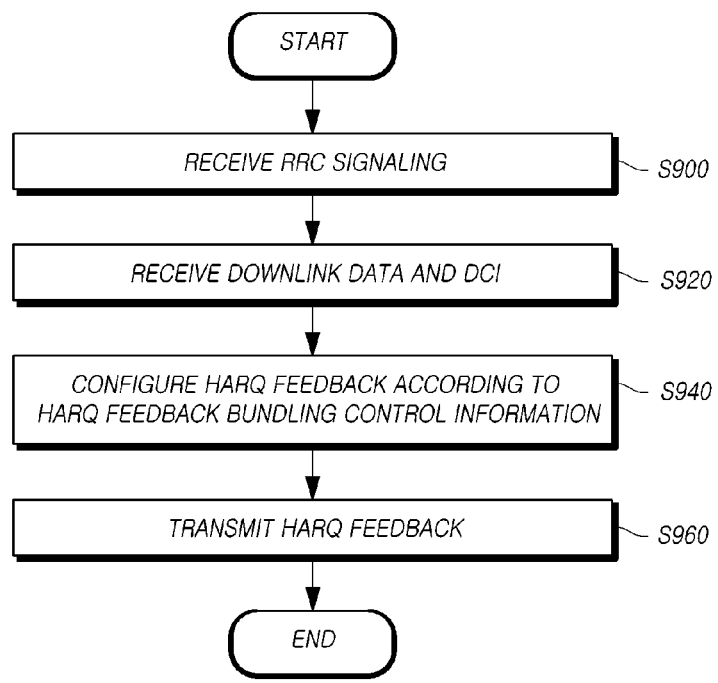
FIG. 9 is a flowchart illustrating a HARQ feedback bundling process of a terminal according to the present embodiments.

FIG. 9 illustrates a HARQ feedback transmission method of a terminal according to embodiments.

Referring to FIG. 9, the terminal receives the number of subframes for bundling a HARQ feedback and a HARQ feedback information size through RRC signaling (S900).

The terminal receives DL data in at least one subframe and receives DCI including position information of a subframe for transmitting the HARQ feedback and a HARQ feedback bundling sequence (S920).

In addition, the terminal receives a HARQ feedback delay offset through the RRC signaling or the DCI.

The terminal configures HARQ feedback information for a reception result of one or more pieces of the DL data according to HARQ feedback bundling control information received from the BS (S940).

In addition, the terminal transmits the HARQ feedback information bundled from a subframe having the smallest HARQ feedback bundling sequence to a subframe after the HARQ feedback delay offset (S960).

Figure 10:
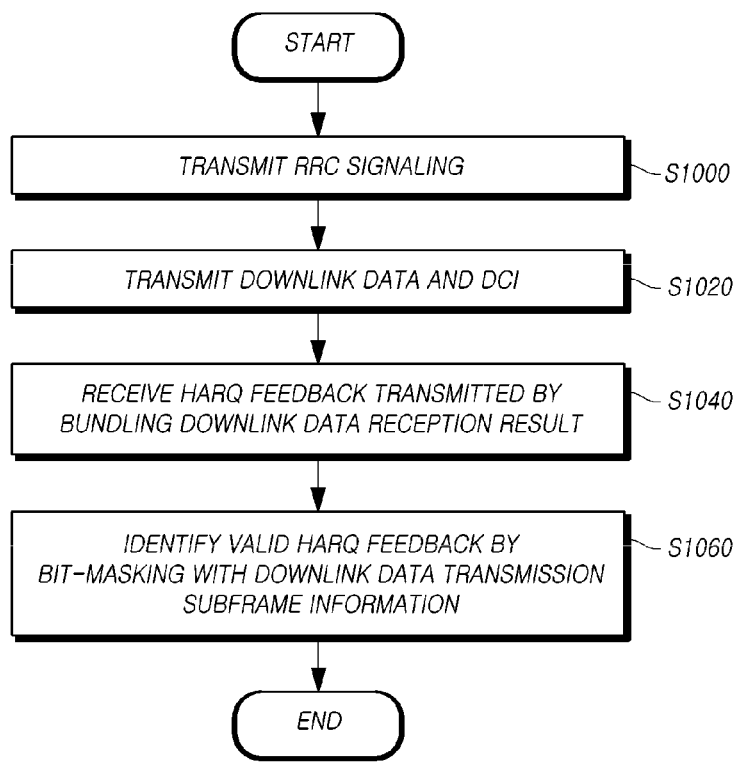
FIG. 10 is a flowchart illustrating a downlink HARQ operation process of a base station according to the present embodiments.

FIG. 10 illustrates a HARQ feedback reception method of a BS according to embodiments.

Referring to FIG. 10, the BS transmits the number of subframes for bundling a HARQ feedback and a HARQ feedback information size to the terminal through RRC signaling (S1000).

The BS transmits DL data in at least one subframe and transmits DCI including position information of a subframe for transmitting the HARQ feedback and a HARQ feedback bundling sequence (S1020).

In this case, a HARQ feedback delay offset may be transmitted through the RRC signaling or the DCI.

The BS receives HARQ feedback information obtained by bundling a reception result for one or more pieces of the DL data from the terminal (S1040).

The BS bit-masks the HARQ feedback information on the basis of information of a transmission subframe of the DL data and extracts valid information from the HARQ feedback information (S1060).

The BS identifies the reception result for the DL data transmitted in the one or more subframes through the HARQ feedback information received in one subframe and re-transmits the DL data of a subframe during which the terminal fails to receive the DL data, in a subframe after a predetermined duration.

According to the embodiments, the HARQ feedback bundling control information is provided to the terminal through the RRC signaling and the DCI, and the HARQ feedback information obtained that is bundled with respect to the reception result of the one or more pieces of the DL data is received from the terminal.

Therefore, it is possible to efficiently support the HARQ operation between the terminal and the BS while minimizing the UL resource overhead in the dynamic TDD system.

A reference content or reference documents described in the above-described embodiments is omitted for simplifying the description of the specification, and configures a part of the present specification. Therefore, it is to be construed that adding the reference content and some contents of the reference documents to the present specification or describing the reference content and some contents of the reference documents in the claims corresponds to the scope of the present disclosure.

The above embodiments of the present disclosure have been described only for illustrative purposes, and those skilled in the art will appreciate that various modifications and changes may be made thereto without departing from the scope and spirit of the present invention. Therefore, the embodiments of the present disclosure are not intended to limit, but are intended to illustrate the technical idea of the present invention, and the scope of the technical idea of the present invention is not limited by the embodiments. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This patent application claims priority from Korean Patent Application Nos. 10-2016-0011308 & 10-2016-0087313, filed on Jan. 29, 2016 & Jul. 11, 2016, under 35 U.S.C § 119(a), the entire of which is incorporated herein by reference. In addition, if this patent application claims priority to any country other than the United States by the same reason as above, the entire of which is incorporated herein by reference.

What is claimed is:

1. A method of processing a hybrid automatic repeat request (HARQ) of a terminal in a wireless communication system, the method comprising:
   receiving a number of subframes for bundling a HARQ feedback of the terminal and a HARQ feedback information size through radio resource control (RRC) signaling;
   receiving downlink data and downlink control information including position information of a subframe for transmitting the HARQ feedback and a HARQ feedback bundling sequence in one or more subframes;
   receiving a HARQ feedback delay offset in at least one of the RRC signaling and the downlink control information;
   determining, based on the received HARQ feedback delay offset, a number of subframes to wait before transmitting the HARQ feedback; and
   transmitting the HARQ feedback for one or more pieces of the downlink data in one subframe determined based on the determined number of subframes.

2. The method of claim 1, wherein in the bundling of the HARQ feedback information for the one or more pieces of the downlink data, a bit position in the HARQ feedback information is determined according to an order of the HARQ feedback bundling sequence included in the downlink control information for allocating each piece of data.

3. The method of claim 1, wherein:
   when the HARQ feedback information size is 1 and when all pieces of the downlink data transmitted in a subframe corresponding to the number of the subframes for bundling the HARQ feedback are received, an acknowledgement (ACK) is transmitted as the HARQ feedback; and
   when the HARQ feedback information size 1 and when all pieces of the downlink data transmitted in the subframe corresponding to the number of the subframes for bundling the HARQ feedback are not received, a NAK is transmitted as the HARQ feedback.

4. The method of claim 1, wherein, when the HARQ feedback information size is greater than 1, the HARQ feedback is configured according to whether to receive all pieces of the downlink data transmitted in a subframe corresponding to a number obtained by dividing the number of the subframes for bundling the HARQ feedback by the HARQ feedback information size.

5. The method of claim 1, wherein, when the number of the subframes for bundling the HARQ feedback is equal to the HARQ feedback information size, the HARQ feedback is configured and transmitted according to whether to receive the downlink data in a subframe corresponding to the number of the subframes for bundling the HARQ feedback and according to the HARQ feedback bundling sequence.

6. The method of claim 1, wherein, when the HARQ feedback delay offset in each of the successive subframes is different or when the HARQ feedback bundling sequence is not reduced by a subframe duration, the HARQ feedback for the downlink data transmitted in the successive subframes is divided and transmitted.

7. A method of receiving, by a base station, a hybrid automatic repeat request (HARQ) in a wireless communication system, the method comprising:
   transmitting a number of subframes for bundling a HARQ feedback of a terminal, a HARQ feedback delay offset, and a HARQ feedback information size through radio resource control (RRC) signaling;

transmitting downlink data and downlink control information including position information of a subframe for transmitting the HARQ feedback and a HARQ feedback bundling sequence in one or more subframes; and receiving the HARQ feedback for one or more pieces of the downlink data in one subframe, the subframe received a determined number of subframes after the downlink data transmission is complete, the determined number of subframes determined based on the HARQ feedback delay offset included in at least one of the RRC signaling and the downlink control information.

8. The method of claim 7, wherein in configuring the downlink control information related to HARQ feedback bundling for one or more pieces of the downlink data, a bit position in the HARQ feedback information is determined by giving the HARQ feedback bundling sequence according to an order of a transmission subframe.

9. The method of claim 7, wherein:
when the HARQ feedback information size is 1 and when all pieces of the downlink data transmitted in a subframe corresponding to the number of the subframes for bundling the HARQ feedback are received by the terminal, an acknowledgement (ACK) is received as the HARQ feedback; and
when the HARQ feedback information size is 1 and when all pieces of the downlink data transmitted in the subframe corresponding to the number of the subframes for bundling the HARQ feedback are not received by the terminal, a NAK is received as the HARQ feedback.

10. The method of claim 7, wherein, when the HARQ feedback information size is greater than 1, the HARQ feedback is received according to whether the terminal receives all pieces of the downlink data transmitted in a subframe corresponding to the number obtained by dividing the number of the subframes for bundling the HARQ feedback by the HARQ feedback information size.

11. The method of claim 7, wherein, when the number of the subframes for bundling the HARQ feedback is equal to the HARQ feedback information size, a) the configured HARQ feedback is received according to whether the terminal receives the downlink data transmitted in a subframe corresponding to the number of the subframes for bundling the HARQ feedback and according to the HARQ feedback bundling sequence, b) the received HARQ feedback is bit-masked, and c) a valid HARQ feedback is extracted based on whether the downlink data for each subframe is transmitted.

12. The method of claim 7, wherein, when the HARQ feedback delay offset in each of the successive subframes is different or when the HARQ feedback bundling sequence is not reduced by a subframe duration, the HARQ feedback for the downlink data transmitted in the successive subframes is received in different subframes.

13. A terminal for processing a hybrid automatic repeat request (HARQ) in a wireless communication system, the terminal comprising:

a receiver configured to receive a number of subframes for bundling a HARQ feedback and a HARQ feedback information size through radio resource control (RRC) signaling, receive downlink data and downlink control information including position information of a subframe for transmitting the HARQ feedback and a HARQ feedback bundling sequence in one or more subframes, and receive a HARQ feedback delay offset through at least one of the RRC signaling and the downlink control information; and a transmitter configured to transmit the HARQ feedback for one or more pieces of the downlink data in one subframe after a delay, the delay determined as a number of subframes based on the HARQ feedback delay offset.

14. The terminal of claim 13, wherein in the bundling of the HARQ feedback information for the one or more pieces of the downlink data, a bit position in the HARQ feedback information is determined according to an order of the HARQ feedback bundling sequence included in the downlink control information for allocating each piece of data.

15. The terminal of claim 13, wherein:
when the HARQ feedback information size is 1 and when all pieces of the downlink data transmitted in a subframe corresponding to the number of the subframes for bundling the HARQ feedback are received, an acknowledgement (ACK) is transmitted as the HARQ feedback; and
when the HARQ feedback information size is 1 and when all pieces of the downlink data transmitted in the subframe corresponding to the number of the subframes for bundling the HARQ feedback are not received, a no acknowledgement (NAK) is transmitted as the HARQ feedback.

16. The terminal of claim 13, wherein, when the HARQ feedback information size is greater than 1, the HARQ feedback is configured according to whether to receive all pieces of the downlink data transmitted in a subframe corresponding to the number obtained by dividing the number of the subframes for bundling the HARQ feedback by the HARQ feedback information size.

17. The terminal of claim 13, wherein, when the number of the subframes for bundling the HARQ feedback is equal to the HARQ feedback information size, the HARQ feedback is configured and transmitted according to whether the downlink data is received in a subframe corresponding to the number of the subframes for bundling the HARQ feedback and according to the HARQ feedback bundling sequence.

18. The terminal of claim 13, wherein, in a case where feedback delay offset in each of the successive subframes is different or the HARQ feedback bundling sequence is not reduced by a subframe duration, the HARQ feedback for the downlink data transmitted in the successive subframes is divided and transmitted.

* * * * *

UNITED STATES PATENT AND TRADEMARK OFFICE
CERTIFICATE OF CORRECTION

| | | |
|---|---|---|
| PATENT NO. | : 10,771,195 B2 | Page 1 of 1 |
| APPLICATION NO. | : 16/073769 | |
| DATED | : September 8, 2020 | |
| INVENTOR(S) | : Juhee Kim et al. | |

It is certified that error appears in the above-identified patent and that said Letters Patent is hereby corrected as shown below:

In the Claims

In Claim 7, Column 15, Line 10, please replace "subframes dctcrmincd based" with --subframes based--.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*